United States Patent [19]
Sampo et al.

[11] Patent Number: 5,923,270
[45] Date of Patent: Jul. 13, 1999

[54] AUTOMATIC STEERING SYSTEM FOR AN UNMANNED VEHICLE

[75] Inventors: Mikko Sampo; Jarmo Puputti, both of Turenki; Kari Rintanen, Espoo; Hannu Mäkelä, Helsinki; Markku Ojala, Espoo, all of Finland

[73] Assignee: Modulaire Oy, Finland

[21] Appl. No.: 08/737,554

[22] PCT Filed: May 12, 1995

[86] PCT No.: PCT/FI95/00253

§ 371 Date: Jan. 22, 1997

§ 102(e) Date: Jan. 22, 1997

[87] PCT Pub. No.: WO95/31759

PCT Pub. Date: Nov. 23, 1995

Related U.S. Application Data

[30] Foreign Application Priority Data

May 13, 1994 [FI] Finland ..................................... 942218

[51] Int. Cl.⁶ .................................................... G08G 1/123
[52] U.S. Cl. .............................. 340/988; 180/6.7; 701/50; 701/300
[58] Field of Search ........................... 180/168, 9.1, 9.21, 180/6.7, 6.2; 318/587; 701/213, 300, 1, 23, 24, 41, 50; 340/988, 990; 342/357, 457

[56] References Cited

U.S. PATENT DOCUMENTS 5,503,232  4/1996  Matsushita et al. ..................... 180/6.2
5,684,476  11/1997  Anderson ................................. 340/988

FOREIGN PATENT DOCUMENTS 494499   7/1992  European Pat. Off. .
496538   7/1992  European Pat. Off. .
522829   1/1993  European Pat. Off. .
578325   1/1994  European Pat. Off. .
91 09375 6/1991  WIPO .

OTHER PUBLICATIONS

Maybeck, P., *Stochastic Models, Estimation, and Control,* "Application of Kalman filtering to inertial navigation systems", 1979, pp. 291–297.

*Primary Examiner*—Brent A. Swarthout
*Attorney, Agent, or Firm*—Ostrolenk, Faber, Gerb & Soffen, LLP

[57] ABSTRACT

The invention relates to an autonomous navigation system for an unmanned vehicle. The tracks or wheels are driven by hydraulic reversible motors, having the output thereof regulated by valves whose relative control can be used for controlling both heading and speed. The vehicle carries a navigation computer which receives positional information from an external positioning sytems. A ground station computer has been supplied with a digitized map over a predetermined path and the ground station computer is in a two-way radio communication with the vehicle navigation computer which is supplied with the information relating to the path. An established path, which is received from the external positioning system, is compared to the predetermined path and the vehicle navigation is modified for compensating the deviations.

19 Claims, 2 Drawing Sheets

AUTOMATIC STEERING SYSTEM FOR AN UNMANNED VEHICLE

The present invention relates to an autonomous navigation system for an unmanned vehicle, comprising
- drive wheels or track rollers on the opposite sides of the vehicle;
- drive means for operating the wheels or track rollers;
- control elements for the drive means for varying the speed of the wheels or track rollers;
- a navigation computer included in the vehicle for operating said control elements;
- an external positioning system for supplying positional information about the vehicle to said navigation computer; and
- a ground station computer outside the vehicle in interaction with the operator, whereby the ground station computer has been supplied with a digitized map containing a predetermined path or course and the ground station computer is in a two-way radio communication with the vehicle navigation computer which is supplied by the ground station computer with information about a curve following the point sequence of said course, the navigation computer using said information to establish set values for the vehicle speed and course profile, said set values being transmitted as control parameters to said control elements for regulating the vehicle speed and heading.

The drive mechanism for a system of the invention is preferably constructed hydraulically, the drive wheels or track rollers being driven by hydraulic motors and hydraulic pumps, whereby both the speed and the heading can be regulated by controlling valves included in the hydraulic system.

One particular application of the invention involves agricultural vehicles which are used for operating farm equipment on the field over a predetermined course.

The trend in agricultural machines has been the introduction of increasingly large and heavy machines. This has resulted in excessive compaction of the ground which affects the fertility properties of the ground. Efforts have been made to compensate for this by intensive fertilization and increased harrowing.

The unmanned vehicle can be constructed to be considerably lighter as it requires neither a cabin nor accessories for the operator's comfort. In addition, the center of gravity can be set considerably lower and thus, for example, the counterweight required by agricultural machines need not be as heavy as that required by traditional tractors. The working tools will also be cheaper.

The operating widths of e.g. agricultural machines have increased to such an extent that the operator cannot see from his or her position where the edges of an operating range meet each other. Especially with wide pesticide sprayers, there will be overlapping of treated areas and/or untreated areas will remain between treated paths. The automatic navigation can be used for bringing the edges of operating paths more closely together.

Traditionally, the driving has proceeded along certain driving paths which are compacted and therefore not sown. Thus, up tp almost 10% of the field area remains unproductive. With autonomous navigation it is possible to offset the driving paths year by year and thus to sow the entire field area. However, if it is desirable to always drive along the same paths, the autonomous navigation enables this as well.

Another benefit gained by by autonomous navigation is the elimination of seasonally required skilled driving labor.

The components of technology required for autonomous navigation are already existent and commercially available but these components have not yet been assembled for a practically functional unit, which would serve as an autonomous navigation system for an unmanned vehicle with a sufficient positioning accuracy.

For example, a gyroscope can be used for providing directional information, whereby the progress can occur in a desired direction or heading towards a desired location. For a variety of reasons, however, there will gradually occur deviation, i.e. the gyroscopic control accumulates an error that must be eliminated. This requires a remote positioning system whereby the position of a vehicle can be determined for correcting the heading.

It is known to combine a remote positioning system (e.g. satellite-based GPS/Global Positioning System) with directional information calculated by means of a gyroscope. This combination by means of sp-called Kalman filtering has been described e.g. in the book by Peter S. Maybeck "Stochastic models, estimation, and control" from 1979 pp. 291–297 in article 6.3 "Application of calman filtering to inertial navigation systems". This has also been disclosed in Patent publication WO 91/09375. In this prior known system, the directional navigation or piloting is based on conventional wheel steering and, in addition, the joint operation between a central computer and a vehicle-designated control computer is primarily designed for mining vehicles and is poorly applicable to the operation of agricultural vehicles, which requires versatile control and operation capabilities from a ground station computer.

A particular problem is that the prior known solutions do not achieve a sufficient (order of centimeters) accuracy due on the one hand to a delay and interruptions associated with a GPS signal and on the other hand to the position of the navigating point of a vehicle, which is generally other than the xyz-position of a GPS antenna.

SUMMARY OF THE INVENTION

One object of the invention is to provide a navigation system, wherein the positioning accuracy is improved such that the system is applicable e.g. to the navigation of an unmanned agricultural vehicle or to other similar applications which require a positioning accuracy in the order of centimeters.

A second object of the invention is to provide a navigation system for vehicles, wherein the speed and directional controls are combined to be carried out in a structurally and control-technically simple fashion such that the attained high positioning accuracy can be put to useful operation.

These objects are achieved on the basis of the characterizing features set forth in the annexed claim 1. The non-independent claims disclose preferred embodiments for the invention.

BRIEF DESCRIPTION OF THE DRAWINGS

The invention will now be described in more detail with reference made to the accompanying drawings, in which.

DESCRIPTION OF A PREFERRED EMBODIMENT

Figure 1:
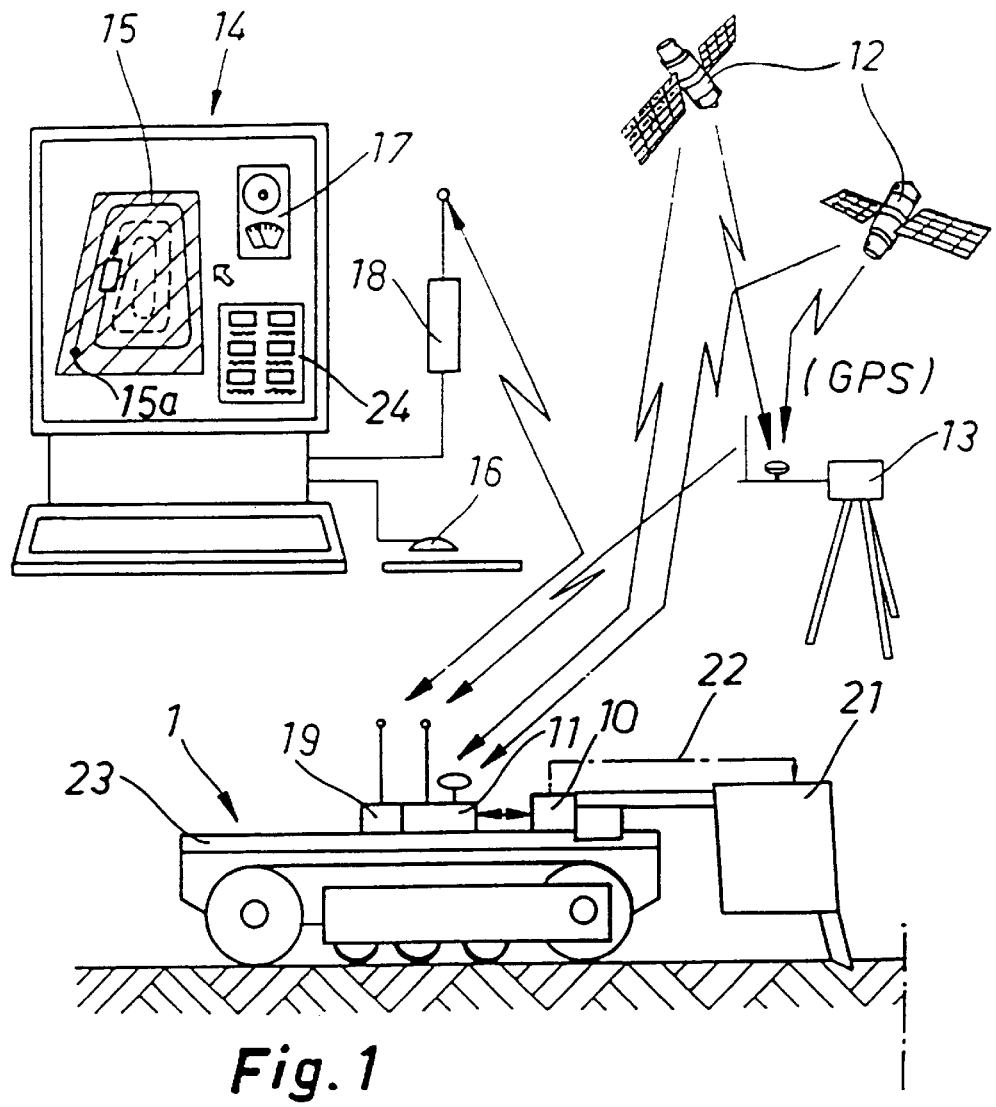
FIG. 1 shows a structural and operational diagram for a system of the invention.
Figure 2:
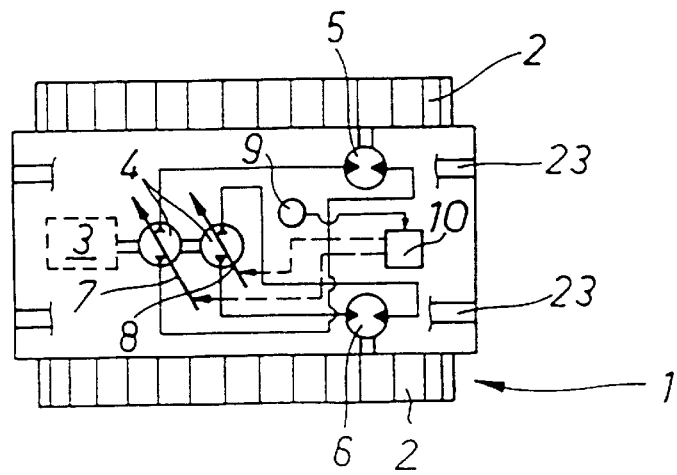
FIG. 2 is a schematical plan view of a vehicle included in the system and the most vital components thereof.

In the illustrated case, a vehicle 1 has a low design and operates by means of crawler tracks 2. Naturally, wheels can be used as well. An internal combustion engine 3 operates hydraulic pumps 4 which in turn operate hydraulic reversible motors 5 and 6 for driving the track rollers 2. The hydraulic transmission is effected by means of two separate closed circuits. Each track roller 2 is provided with a hydraulic motor 5, 6, controlled by its assigned variable displacement pump 4. The output of pumps 4 is regulated by varying the pre-control thereof e.g. by means of proportional hydraulic valves 7, 8 which are controlled electrically. The use of valves 7 and 8 connected to the pumps 4 for regulating the volume flow produced thereby enables the regulation of a vehicle speed and the control over its heading. Of course, the speed control can also be effected by means of an automatic transmission. The directional navigation is effected by varying the relative control of the valves 7 and 8 such that the outside track roller 2 rotates faster than the inside track roller 2. Hence, this eliminates the need of building turning wheels and a separate steering control therefor.

The valves 7, 8 are controlled by means of a navigation computer 10, which in turn receives the information required for the calculation of navigation data from three different sources, namely from one or a plurality of gyroscopes 9, a remote positioning system 12 and a ground station computer 14. Further use is made of feedback information received from sensors measuring the speed of the track rollers 2 or from a ground speed radar, and possibly also acceleration sensors.

The following describes in more detail these system components and the adaptation thereof to joint operation.

The position of the vehicle 1 (heading and bankings) can be calculated in real time by using the gyroscopes 9 (one or more) as well as acceleration sensors. It is possible to employ piezoelectric oscillatory gyroscopes and/or fiber optical gyroscopes, which require neither maintenance nor include any moving parts. The calculation of a position is effected by means of special matrix calculation, whereby the position can be measured relative to all three rotational axes (x, y, z).

The vehicle positional data can be combined in the navigation computer 10 with speed information measured from the vehicle wheels or track rollers 2, whereby the vehicle position can be monitored by a so-called dead-reckoning principle. However, all systems based on dead-reckoning calculation are prone to the accumulation of positional error and require the support of some external positioning system.

A system of the invention does not require the use of inertial positioning but the gyro 9 included in the system is used as an auxiliary in dead-reckoning calculation for maintaining the heading information. In most cases, a single gyro is sufficient since the heading error caused by the deviation of the gyro level from a reference level can be compensated from long-term measuring information by means of a remote positioning system. The dead-reckoning calculation also utilizes the measuring of a distance covered by the track rollers (and their speed; calculable from the distances). The positioning by dead-reckoning calculation can also be described by the terms break-line or vector positioning.

In the present case, the remote positioning system comprises a kinematic differential GPS (Global Positioning System) based on satellites 12, having its positioning accuracy improved by means of a reference station 13. Such a system is commercially available and has a positioning accuracy in the order of 10 cm. The vehicle 1 carries a receiver 11 equipped with a GPS antenna for receiving the positioning system signals from the satellites 12 and the reference station 13. The receiver unit 11 may already involve some pre-processing of signals for providing the navigation computer 10 with position coordinates (x, y and z) delivered by the positioning system.

The remote positioning system can be any positioning system capable of providing sufficiently accurate position data (<10 cm), sufficiently often (appr. 1 Hz), at an appropriately minute delay (<1 s). The system must allow the movement of a platform during the position measurement.

The fusion of this remote positioning system with the above dead-reckoning system produces a high-performance positioning system by virtue of e.g. the following considerations:

the dead-reckoning system improves the accuracy of remote positioning (Kalman filtering)

the measuring delay of a remote positioning system can be eliminated in dead-reckoning calculation the high-speed (10 Hz) measuring of vehicle heading is necessary in path monitoring for preventing oscillation.

Thus, the remote positioning system can operate at a relatively low sampling frequency, e.g. 1 Hz, and it need not indicate the vehicle heading.

Figure 3:
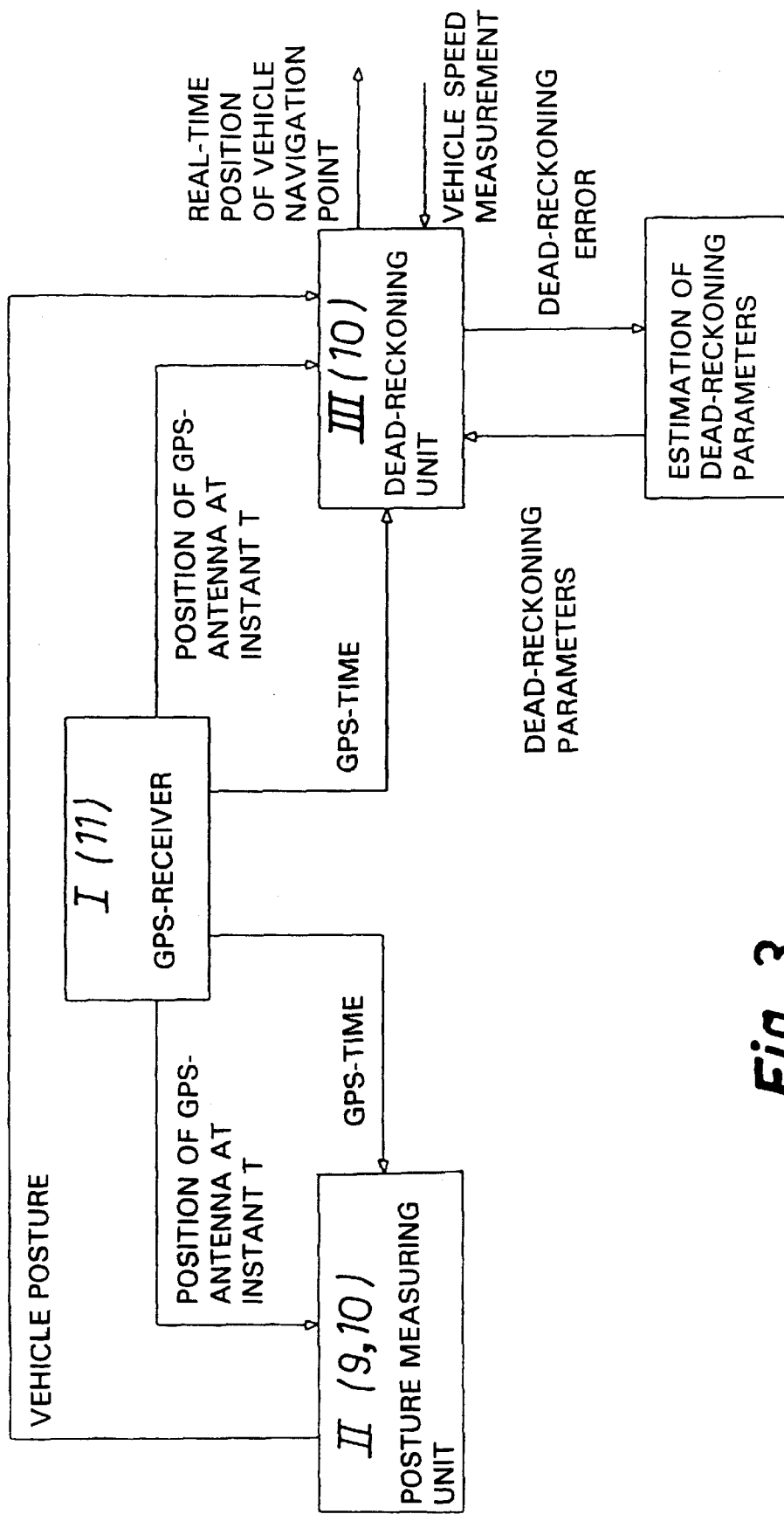
FIG. 3 shows a block diagram for a positioning system of the invention.

In reference to FIG. 3, the following describes still further some essential features of the invention:

1. Positioning at the accuracy of a few centimeters an arbitrary point (especially a navigation point) of a vehicle by using a kinematic differential GPS-apparatus as well as a three-axis (based on inertia sensors) position measuring apparatus.
2. Compensation of a mesuring delay in the kinematic differential GPS-apparatus by means of a dead-reckoning unit.
3. On-drive determination of the position of vehicle points (navigation point) according to equation (1) as well as the distance measuring factor by using a kinematic differential GPS-apparatus as well as dead-reckoning sensors.

A kinematic differential GPS-measuring apparatus enables the direct positioning of a single vehicle point at the accuracy of a few centimeters. However, all that is known about the position of other vehicle points is that they are located on the surface of an R-radius sphere whose center is determined by the location of a GPS-antenna and R is the distance of a point from the GPS-antenna.

The vehicle navigation point is that point of a vehicle whose xy-coordinates are intended to comply with a given xy-path. The navigation point is generally selected in such a manner that, as a vehicle is moving, the navigation point has a direction of movement which is the same as the nose direction calculated from the vehicle position:

$$V = Hv, \quad (1)$$

where V is the speed vector of a navigation point (xyz), H is the directional vector of a vehicle longitudinal axis (xyz) and v is the traveling velocity (scalar) measured from vehicle wheels, track rollers or by means of a ground speed radar or a like.

This feature facilitates the use of dead-reckoning technique. However, the position of a point according to equation (1) is not precisely known merely by mathematical means but, in order to obtain a high accuracy, the position of a point according to equation (1) must be estimated on the basis of the measured behavior of a vehicle. The position (in a set of vehicle coordinates) of a point according to equation (1) may change during a drive.

The navigation point is not generally located at a high position, so that the bankings of a vehicle do not affect the monitoring of a path. The GPS-antenna cannot be generally installed in such a manner that the navigation point and the position of a GPS-antenna coincide with respect to all coordinates (xyz).

Typically, there is a difference at least in height since the GPS-antenna must be located in a high position for making sure of good visibility. Hence, the position of a navigation point cannot be known without knowing also the posture of a vehicle.

In the arrangement of FIG. 3, blocks (II) and (III) are synchronized to the GPS-time in response to a GPS clock signal produced by a GPS-receiver (I) or a GPS time signal. Thus, the GPS measuring time stamp included in measuring data produced by a GPS apparatus can be used for precisely determining the age of measuring or the measuring delay. Knowing the real measuring delay during the motion is important since, when moving at the speed of e.g. 10 km/h, even an error as small as 10 ms shall induce a positioning error of 2.8 cm in the estimation of a measuring delay.

In the arrangement, the block (III) uses the measured (in a set of ground coordinates) position of a GPS-antenna, the position data of a vehicle and the estimated position of a vehicle navigation point (in a set of vehicle coordinates) for calculating the position of a vehicle navigation point in the set of ground coordinates.

In the arrangement, the block (III) compensates for a GPS measuring delay by predicting a distance covered by a vehicle during the measuring delay. The prediction is based on dead-reckoning technique and an estimated distance measuring factor.

In the arrangement, a block (IV) estimates the relative xyz-position between a navigation point and a GPS-antenna that provides the optimum compilation of GPS measuring and dead reckoning, in other words, the optimum workout of equation (1). In addition, the block (IV) estimates a distance measuring factor or how the distance covered by vehicle wheels or track rollers proportionally corresponds to the distance measured on the basis of GPS measuring.

The ground station computer 14 is provided with a digitized map over the operating environment. The ground station computer plans a course 15 suitable for working operations in reciprocal action with the operator. The ground station computer 14 is over a radio receiver and transmitter 18 in a two-way radio communication with a transceiver unit 19 included in a vehicle and further with the navigation computer 10. This communication setup takes care of establishing a reliable and correct data transfer communication between the ground station and the navigation computer. In the assembled configuration, the communication is co-integrated in connection with the ground station and the navigation computer. The planned course is transmitted in a parameter format (e.g. a spline curve) to the navigation computer 10 which, with the assistance of a positioning system, controls the operation of vehicle track rollers for running a desired course or path.

The navigation computer 10 unloads the data for a path to be driven as temporary values of speed and path trajectory and those values are in turn converted into vehicle navigation parameters used for controlling the valves 7, 8 for the regulation of vehicle speed and heading. The course covered in response to this navigation and created by using positional data provided by the above-mentioned positioning systems is compared to the predetermined course 15. When the covered course is different from an intended course, the control parameters of valves 7, 8 are changed for compensating the deviations.

The predetermined path 15 of a digitized map can be determined by driving the vehicle 1 over a desired course under manual control while keeping the remote positioning system in operation. A sequence of points (x, y, z coordinates) produced this way is recorded. However, the thus obtained sequence of points should not be directly used as a pre-programmed path because of a measuring noise and density contained therein. The sequence of points must be suitably spaced out to include points e.g. at the distances of 1–2 m. Thus, the storage capacity required for recording the path is substantially reduced. The on-drive course planning is also facilitated by the fact that the distance between points is more or less constant. The thus recorded path can then be used as a course pre-programmed by the ground station computer 14 and visible on a display screen which can be monitored for observing the real-time progress of the automatically navigated vehicle 1 along the path 15. Also visible on the display screen of computer 14 are vehicle gauges 17, such as a speedometer, an engine thermometer etc. In addition, the display screen of computer 14 may include a menu 24 that can be used e.g. under the control of a mouse 16 for issuing commands (e.g. speed variation commands) to the vehicle 1. The mouse 16 or a display screen pen can also serve as a tool for designing a course. The recorded path can be altered by means of the ground station computer 14 or the course can be entirely designed and determined by means of the computer 14 on a scaled map over a field area. In addition, the ground station computer 14 may include a storage for alarms, an emergency brake for the vehicle 1 and the operating history of vehicle 1. The course alteration on a screen or the programming thereof entirely by means of a map background can be effected in accordance with conventional CAD designing principles.

The on-drive course calculation can be effected either by means of the navigation computer or the ground station computer 14. The purpose of course calculation is to provide the vehicle 1 at each instant with an unambiguous desired position, a desired heading, as well as a path-curvature reading. For the servo adjustment of a position and heading there is a continuous, smoothly behaving curve adapted to extend over the pre-programmed course points for readily determining the position of a vehicle, the direction and curvature of a tangent for each instant and for all possible vehicle positions. The path curvature must change smoothly when advancing along the path as stepwise curvature changes are not possible for most vehicles. If a vehicle is directed to follow a kinematically impossible path, the consequence involves transients and vibrations in the bends. The most general course profiles used for vehicles include a so-called clotoidal curve as well as various spline curves. The clotoidal curve is primarily used in road building and an essential feature therein is that the path curvature grows evenly when driving into a bend. However, the clotoidal curve is heavy in terms of calculation as its adaptation requires iteration. It is preferable to use a so-called cubic B-spline curve, whose adaptation to a given course point sequence is straightforward and easy. The path consisting of B-splines conforms with an optimum smoothness to a given path point sequence and has an evenly varying curvature at each path point.

Thus, holding a vehicle on the projected path 15 requires not only the open navigation but also the use of feedback control.

The actually obtained positional and directional value measured by a positioning system can be alternatively transmitted to the ground station computer 14 where it is compared to corresponding setup values produced on the basis of the pre-programmed path 15. The calculated errors are used for determining a sensible guidance for a vehicle, i.e. the setup values for path curvature and speed, the corresponding controls of valves 7 and 8 being used in an effort to eliminate the detected error.

The control system has a configuration which differs substantially from a traditional, so-called unit controller, which measures one input variable and controls one output variable, generally by means of a PID control strategy. In the control of position and heading, the calculation of a set curvature value is affected by three factors: a positional x-error, a positional y-error and a directional error. The question is about a so-called space adjuster, wherein three input variables are used for controlling two output variables (path curvature and speed). However, the most simple, so-called space adjusters do not always function well in path monitoring, since the operation and stability thereof are not ensured in all conditions as a result of the non-linearity of a path monitoring problem. In practice, it is possible to use a so-called optimum-control based space adjuster, which returns a vehicle onto its path at an optimally high speed, avoiding excessive curvatures during the corrective action.

Since the path curvature of a crawler-tracked vehicle can be determined by means of a speed difference between the track rollers, the path-curvature control can also be effected in an alternative fashion. Thus, the vehicle is mostly driven just straight on and the turns are effected by means of quick braking actions of the inside track roller. Such a "relay-like" mode of navigation is functional with a lower hydraulic output than the mode of navigation based on a speed difference of the track rollers. The navigation depends also on the position of a vehicle origo. In this context, the origo refers to the point of a vehicle following a given path. In the navigation based on a speed difference between the track rollers, the origo must have a position which is as symmetrical as possible.

Another benefit gained by the invention is that the digitized map may include information about the local variations concerning the amount of crop, required fertilization and the required amount of pesticides. This information can be used as a basis for controlling an agricultural tool 21, such as a fertilizer or a pesticide sprayer, pulled by the vehicle 1, the control being effected e.g. by rotating a fertilizer supply wheel at a higher speed over certain areas for the automatic balancing of a nutrient level. This can be carried out by exploiting the information received from a combine and relating to which section of a field has produced a certain crop level.

The agricultural tools 21 can be mounted on horizontal rails 23 on top of the vehicle at a desired distance from the vehicle on either end or in the middle thereof. The hoisting and lowering and such further operations of agricultural tools can be controlled from the ground station computer either manually or automatically as control commands relating to various points of the path 15. Driving the path with autonomous navigation can be commenced by driving the vehicle under manual control to a path starting point 15a. All points included in the path 15 can be given in various years a certain size, e.g. 0,5 m, of an increase or reduction of x and y coordinates so as to avoid the formation of a driveway and to gain a 5–10% increase of productive area. Avoiding the compaction of field land results also in ecological improvement of the ground.

We claim:

1. An autonomous navigation system for a surface vehicle, the vehicle having lateral sides and having respective drivable vehicle moving elements on each lateral side; drive means for operating the drivable moving elements; control elements for the drive means for varying the relative speeds of the drive elements at the lateral sides, thereby to control the travel direction of the vehicle;

a navigation computer in the vehicle for operating the control elements;

an external positioning system for supplying position information about the vehicle to the navigation computer;

a ground station computer separated from the vehicle; the ground station computer having a stored map of a predetermined path or course for the vehicle, the ground station computer being adapted to be in communication with the navigation computer for supplying the navigation computer with information for navigating the vehicle to follow a sequence of points defining the path or course; the navigation computer including means for using the information supplied by the ground station computer for setting values for vehicle speed and course profile and the navigation computer being adapted for transmitting respective control parameters to the control elements for regulating the drive means for regulating the vehicle speed and heading;

a kinematic differential GPS-positioning system measuring apparatus located on the vehicle for producing information as to the position of the vehicle, the GPS positioning system including a GPS time signal receiver on the vehicle;

a vehicle speed measuring apparatus for measuring the vehicle speed and for combining the vehicle speed measurement with the position measurement synchronized with the GPS time signal produced in the GPS receiver;

the navigation computer being adapted to compare the actual established path of the vehicle with the predetermined path in the ground station computer and the navigation computer being adapted to adjust the control parameters of the control elements for compensating for the deviations between the predetermined path and the established path.

2. The navigation system of claim 1, wherein the ground station computer includes a digitized map containing the predetermined path or course.

3. The system of claim 2, wherein the digitized map in the ground computer is produced in accordance with the process of driving the vehicle over a preset course with positioning system in operation and informing the digitized map from the sensed information as to the position of the vehicle over time.

4. The navigation system of claim 1, wherein the ground station computer and the navigation computer include two-way radio communication means for two-way radio communication of navigating information between the computers.

5. The navigation system of claim 1, wherein the navigation computer includes a dead reckoning unit to which the GPS-positioning system measuring apparatus is connected for supplying the dead reckoning unit with position information, and the vehicle speed measuring apparatus also being connected with the dead reckoning unit, wherein the dead reckoning unit is synchronized together with the GPS-positioning system measuring apparatus to the GPS time signal produced by the GPS receiver on the vehicle whereby the navigation computer is enabled to compare the actual established path of the vehicle with the predetermined path.

6. The system of claim 4, wherein the dead reckoning unit is adapted for estimating the position of a navigation point that is deviated from the position of a vehicle GPS antenna on the vehicle in the dead reckoning unit, the dead reckoning unit receiving information as to the position of the GPS antenna measured in ground coordinates, information about the posture of the vehicle, information about the position of a navigation point estimated in a set of vehicle coordinates, and the dead reckoning unit being adapted to use that information to calculate the position of the vehicle navigation point in a set of ground coordinates.

7. The navigation system of claim 5, wherein the dead reckoning unit includes means for estimating dead reckoning parameters including a distance measuring factor for indicating the proportion of a distance obtained on the basis of vehicle speed measurement to a distance measured on the basis of a GPS measurement and also the relative position of a vehicle navigation point and the GPS antenna in a set of coordinates for the vehicle.

8. The navigation system of claim 4, wherein the dead reckoning unit includes means for estimating dead reckoning parameters including a distance measuring factor for indicating the proportion of a distance obtained on the basis of vehicle speed measurement to a distance measured on the basis of a GPS measurement and also the relative position of a vehicle navigation point and the GPS antenna in a set of coordinates for the vehicle.

9. The navigation system of claim 5, further comprising a gyroscope on the vehicle connected for supplying directional information to the navigation computer, and the navigation computer being adapted to compare the measured speed of the drivable moving elements at the opposite lateral sides of the vehicle with the directional information provided by the gyroscope for sending information through the control elements to the drivable moving elements.

10. The navigation system of claim 1, further comprising a gyroscope on the vehicle connected for supplying directional information to the navigation computer, and the navigation computer being adapted to compare the measured speed of the drivable moving elements at the opposite lateral sides of the vehicle with the directional information provided by the gyroscope for sending information through the control elements to the drivable moving elements.

11. The navigation system of claim 1, wherein the drive means for the drivable moving elements include a respective hydraulic motor for operating the moving elements on each lateral side of the vehicle.

12. The navigation system of claim 10, wherein the drive means further comprise respective hydraulic pumps for driving the motors;
    the control elements include controllable valves for regulating the pumps and thereby the hydraulic motors so that the speed and heading of the vehicle are regulated by control of the controllable valves.

13. The navigation system of claim 10, wherein the drivable moving elements are at each lateral side of the vehicle and comprise a respective set of drive wheels or a respective set of track rollers at each lateral side.

14. The navigation system of claim 1, wherein the drivable moving elements are at each lateral side of the vehicle and comprise a respective set of drive wheels or a respective set of track rollers at each lateral side.

15. The navigation system of claim 1, wherein the vehicle is an unmanned vehicle.

16. The navigation system of claim 1, wherein the vehicle is an agricultural tractor.

17. The navigation system of claim 15, wherein the tractor has a platform including means thereon for fastening agricultural tools to the tractor.

18. The navigation system of claim 16, wherein the digitized map in the ground station computer includes information selected from one or more of the group consisting of local differences concerning the nature and amount of the crop, required fertilization and required amount of pesticide;
    an agricultural tool supported on the platform of the vehicle and adapted for communication with the navigation computer and with the digitized map in the ground station computer such that the information as to the location of the vehicle causes the ground station computer to operate the agricultural tool for affecting one of the above stated conditions.

19. The navigation system of claim 1, wherein the ground station computer includes a monitor screen showing the real time position of the vehicle on the digitized map; and
    sensors in the vehicle and a menu for producing commands for the remote control over vehicle action.

* * * * *